United States Patent
Yoshioka

(10) Patent No.: US 8,171,056 B2
(45) Date of Patent: May 1, 2012

(54) DATA PROCESSOR, DATA PROCESSING METHOD, AND COMPUTER PRODUCT

(75) Inventor: Tatsuroh Yoshioka, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 385 days.

(21) Appl. No.: 12/041,303

(22) Filed: Mar. 3, 2008

(65) Prior Publication Data

US 2008/0222181 A1 Sep. 11, 2008

(30) Foreign Application Priority Data

Mar. 7, 2007 (JP) ................................ 2007-056824

(51) Int. Cl.
*G06F 7/00* (2006.01)

(52) U.S. Cl. ........ 707/802; 707/693; 707/783; 709/201; 709/247; 715/200

(58) Field of Classification Search ................... 707/802
See application file for complete search history.

(56) References Cited

U.S. PATENT DOCUMENTS

| | | | | |
|---|---|---|---|---|
| 2004/0213472 | A1 * | 10/2004 | Kodama et al. | 382/239 |
| 2006/0044601 | A1 * | 3/2006 | Misawa et al. | 358/1.15 |
| 2006/0101078 | A1 * | 5/2006 | Tashiro et al. | 707/104.1 |

FOREIGN PATENT DOCUMENTS

| | | |
|---|---|---|
| JP | 7-121674 | 5/1995 |
| JP | 8-161250 | 6/1996 |
| JP | 9-252354 | 9/1997 |
| JP | 2001-159959 | 6/2001 |
| JP | 2002-41363 | 2/2002 |
| JP | 2002-278773 | 9/2002 |
| JP | 2004-202889 | 7/2004 |
| JP | 2006-154990 | 6/2006 |

OTHER PUBLICATIONS

Office Action issued Oct. 4, 2011, in Japanese Application No. 2007-056824, filed Mar. 7, 2007.

* cited by examiner

*Primary Examiner* — Fazlul Quader
(74) *Attorney, Agent, or Firm* — Oblon, Spivak, McClelland, Maier & Neustadt, L.L.P.

(57) ABSTRACT

A data processor includes a storage unit, a decompressing module, an interface module, and a data retrieving module. The storage unit stores therein a compressed setting data file including setting data files each compressed in a compression format. The decompressing module decompresses a setting data file, in the compressed setting data file, corresponding to a model of a printer selected for printing. The interface module displays a setting screen corresponding to the setting data file decompressed by the decompressing module. The data retrieving module sets print settings based on settings specified on the setting screen.

16 Claims, 4 Drawing Sheets

FIG. 2

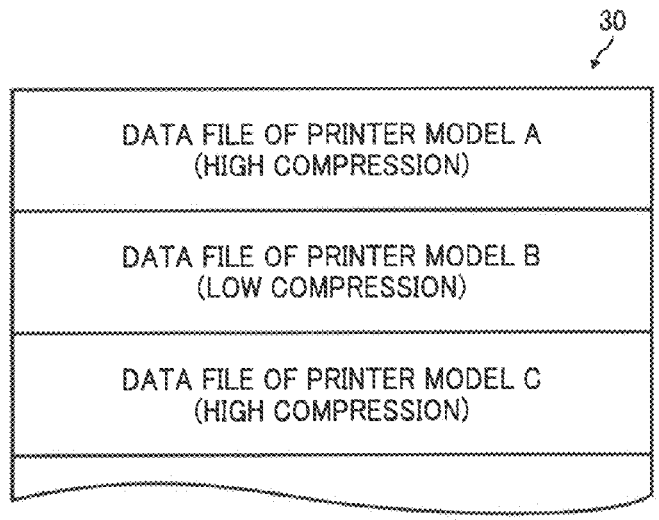

FIG. 3

```
<modification version = "1.0">
</modification>
<model name = "Printer Model A">

<item category = "PAPER">
                <PaperValue = "A4", 297, 210/>
                <PaperValue = "A3", 420, 297/>
        <item>

<item category = "TRAY">
                <TrayValue = "1", A4/>
                <TrayValue = "2", A3, A4/>
        <item>

<item category = "RESOLUTION">
                <ResValue = "600DPI", 600/>
                <ResValue = "1200DPI", 1200/>
        <item>

<item category = "COLOR">
                <ColorValue = "COLOR", RGB/>
                <ColorValue = "MONO", BW/>
        <item>

</model>
```

DATA PROCESSOR, DATA PROCESSING METHOD, AND COMPUTER PRODUCT

CROSS-REFERENCE TO RELATED APPLICATIONS

The present application claims priority to and incorporates by reference the entire contents of Japanese priority document 2007-056824 filed in Japan on Mar. 7, 2007.

BACKGROUND OF THE INVENTION

1. Field of the Invention

The present invention relates to a data processor, a data processing method, and a computer product thereof.

2. Description of the Related Art

For printing directly or via a server on a printing device such as a printer, a multifunction product, and a copier from a data processor such as a personal computer (PC), print settings and print data are sent from the data processor to the printing device so that the printing device can print the print data on a recording medium (sheet). In this case, the data processor having a printer driver compatible with the printing device displays print setting items on a print setting screen through a user interface (UI) of the printer driver. Setting values are set for the respective print setting items. The data processor sends the print settings to the printing device along with the print data. The printing device prints the print data based on the setting values corresponding to the print settings.

In recent years, networking using, for example, a local area network (LAN) is progressing rapidly, and a data processor including PCs and word processors is connected to printing devices via such a network. The data processor carries out printing using the printing devices on the network.

To use a plurality of printing devices on the network, the data processor needs a printer driver compatible with the printing devices to be installed. After specifying print settings with the printer driver and creating print data, the data processor has to issue a print request by sending the print data and the print settings to one of the printing devices.

If a printer driver compatible with printing devices of a plurality of models is installed on the data processor, an printer-driver installation work can be reduced. However, such a printer driver compatible with a plurality of models supports only the greatest common factor function of the models. Due to this, settable print setting contents are restricted and usability is reduced.

Japanese Patent Application Laid-open No. 2006-154990 discloses a conventional technology, in which a print attribute setting file is stored in a storage unit in association with printing purpose data. The print attribute setting file contains data on a pair of a printing device and print attributes settable in the printing device. The print attribute setting file is updated via a network and is selected based on the printing purpose data. The selected print attribute setting file is used as print settings.

In the conventional technology, however, print setting data unique to each of printing devices on the network is stored as the print attribute setting file. Thus, as printing devices on the network increase, the number of print attribute setting files also increases, which places pressure on the storage capacity of the storage unit. Moreover, the print attribute setting file of a frequently used printing device and the print attribute setting file of a hardly used printing device are managed together. Thus, unnecessary print attribute setting files are stored in the storage unit, which also places pressure on the storage capacity of the storage unit.

SUMMARY OF THE INVENTION

It is an object of the present invention to at least partially solve the problems in the conventional technology.

According to an aspect of the present invention, there is provided a data processor that transmits image data and output settings to any one of output devices of a plurality of models via a network to output the image data. The data processor includes a storage unit that stores therein a compressed data file including a setting data file compressed in a compression format, the setting data file containing setting items and setting values specific to a model of an output device; a decompressing unit that decompresses a setting data file in the compressed data file, the setting data file corresponding to a model of an output device selected to output image data; an interface unit that displays a setting screen corresponding to the setting data file decompressed by the decompressing unit; and a setting unit that, when receiving settings specified on the setting screen, sets output settings.

According to another aspect of the present invention, there is provided a data processing method for outputting image data by transmitting the image data and output settings to any one of output devices of a plurality of models via a network. The data processing method includes storing, in a storage unit, a compressed data file including a setting data file compressed in a compression format, the setting data file containing setting items and setting values specific to a model of an output device; decompressing a setting data file in the compressed data file, the setting data file corresponding to a model of an output device selected to output image data; displaying a setting screen corresponding to the setting data file decompressed by the decompressing unit; and setting, upon receipt of settings specified on the setting screen, sets output settings.

According to still another aspect of the present invention, there is provided a computer program product that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a file structure of a compressed setting data file stored in a storage unit shown in FIG. 1;

FIG. 3 is an example of contents of a specific setting data file shown in FIG. 2;

DETAILED DESCRIPTION OF THE PREFERRED EMBODIMENTS

Exemplary embodiments of the present invention are explained in detail below with reference to the accompanying drawings.

Figure 1:
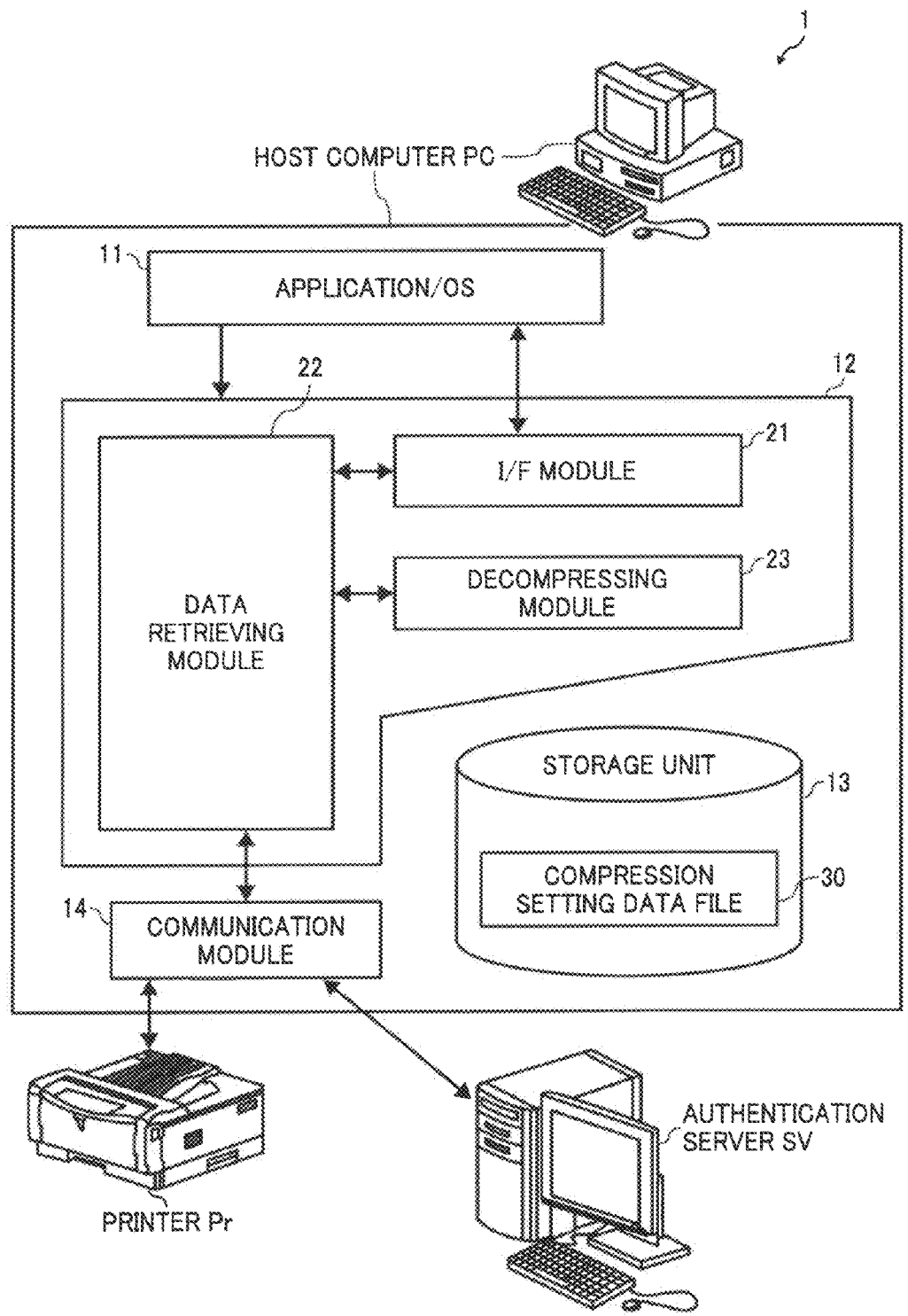
FIG. 1 is a functional block diagram of a printing system and a data processor according to an embodiment of the present invention.

FIG. 1 is a functional block diagram of a printing system 1 and a data processor according to an embodiment of the present invention.

The printing system 1 includes a host computer PC, a printer Pr, and an authentication server SV, which are connected by a network such as LAN. Although FIG. 1 depicts one of each, the printing system 1 can include an arbitrary number of host computers PC and printers Pr.

As the host computer PC can be a common PC of a normal hardware configuration that includes a display and an input unit such as a keyboard and a mouse. As a functional module structure, the host computer PC includes an application/operating system (OS) 11, a driver module 12, a storage unit 13, and a communication module 14.

The host computer PC is a data processor that reads, as a printer driver constituting the driver module 12, a computer program (hereinafter, "data processing prgogram") stored in a storage medium such as a compact disk (CD), a compact disk rewritable (CD-RW), and a flexible disk and runs the data processing program. Alternatively, the host computer PC reads the data processing program as an dedicated computer program, and runs it independently or by combining it with the printer driver. Thus, the host computer PC performs data processing related to print settings (described later).

The application/OS 11 is applications (application software) that are installed and run on the Windows (registered trademark) OS. Examples of the applications include word-processing software, graphic creating software, spreadsheet software, and database software.

Upon receiving a print command for image data created using an application from a user, the application/OS 11 transfers the image data to be printed to the driver module 12.

The storage unit 13, which includes a random access memory (RAM) and a hard disk, stores therein a compressed setting data file 30 and specific setting data files after decompression. As shown in FIG. 2, in the compressed setting data file 30, a plurality of specific setting data files including specific print setting data such as model specific print setting items and setting values of the printers Pr of a plurality of models connected to the network are combined in a predetermined compression format, for example, ZIP and extensible markup language (XML) at a predetermined compression level. For example, as shown in FIG. 2, the specific setting data file of a printer A (printer model A) is compressed at a high compression level. The specific setting data file of a printer B (printer model B) is compressed at a low compression level, and the specific setting data file of a printer C (printer model C) is compressed at the high compression level. The compression format of the compressed setting data file 30 can be expanded using a plug-in module stored in the storage unit 13. In the compressed setting data file 30, the specific setting data files of the models of the printers Pr, which are connected to the network, are combined. The compressed setting data file 30 can be formed by compressing specific setting data files for respective models and combining the compressed specific setting data files as a single file. The compressed setting data file 30 can also be formed by combining together the specific setting data files of all the models and compressing the combined specific setting data files. Due to this, in the compressed setting data file 30, specific setting data files of different models are compressed and also combined, which reduces a data size.

The compressed setting data file 30 is of a format as shown in FIG. 3. The example of FIG. 3 describes the printer A (printer model A). For example, <item category="PAPER"> indicates a sheet type that can be used and <PaperValue="A4", 297,210/> indicates that an A4 sheet of 297 millimeter (mm)×210 mm can be used.

As shown in FIG. 1, the driver module 12 includes an interface (I/F) module 21, a data retrieving module 22, a decompressing module 23, and a common (general-purpose) printer driver (not shown) compatible with all the printers Pr connected to the network.

The common printer driver is compatible with models of the printers Pr connected to the network. The common printer driver sets print settings commonly used for the respective models and performs standard processing of the printers Pr such as image processing to convert image data received from the application/OS 11 into print data that can be interpreted by a printer to be used for printing.

When the driver module 12 is called by a print request from the application/OS 11, the data retrieving module 22 calls, by a call format function, the I/F module 21 for setting printing conditions. When a printer to be used for printing is selected via the I/F module 21, the data retrieving module 22 retrieves, from the storage unit 13, the specific setting data file of the model of the selected printer through the decompressing module 23. Due to this, the user can carry out model specific print settings via the I/F module 21. Upon the user carrying out the model specific print settings, the data retrieving module 22 generates, based on print setting contents specified by the user, print settings to be sent to the printer and also feeds the print setting contents to an imaging unit (not shown). The imaging unit converts image data from the application/OS 11 into print data based on the print settings.

As described later, if an unnecessary specific setting data file that has already been decompressed is left in the storage unit 13 when the decompressing module 23 decompresses the specific setting data file, the data retrieving module 22 deletes the unnecessary specific setting data file.

For avoiding careless decompression of the compressed setting data file 30, the compressed setting data file 30 is protected by predetermined authentication data. Upon the data retrieving module 22 receiving qualified authentication data, the decompressing module 23 decompresses the compressed setting data file 30.

The application/OS 11 or the data retrieving module 22 calls the I/F module 21. The I/F module 21 displays an interface screen, through which the user can select a printer to be used for printing or specify print settings, and receives input selected or specified by the user. In other words, the I/F module 21 displays a printer selection interface screen G1 (see FIG. 4) for selecting one of the printers Pr connected to the network to be used for printing and sends the model of the printer selected on the printer selection interface screen G1 to the data retrieving module 22. The I/F module 21 also displays a specific print setting interface screen G3 (see FIG. 4) enabling print settings specific to the printer of the selected model or a common print setting interface screen G4 (see FIG. 4) enabling settings in the common printer driver. Furthermore, when a user authentication is required to decompress the compressed setting data file 30, the I/F module 21 displays an authentication interface screen G2 (see FIG. 4).

The decompressing module 23 analyzes or decompresses the compressed setting data file 30. From the compressed setting data file 30 stored in the storage unit 13, the decompressing module 23 decompresses a specific setting data file requested from the data retrieving module 22, stores the decompressed specific setting data file in the storage unit 13, and sends it to the data retrieving module 22.

The communication module 14, which is connected to the network (not shown), communicates via the network with the printers Pr and the authentication server SV connected to the network.

Authentication data such as a password and an authentication code for using the compressed setting data file 30 is previously registered in the authentication server SV. Having received an authentication request from the host computer PC with the authentication data input thereto, the authentication server SV performs authentication by referring to the registered authentication data based on the input authentication data, and returns the authentication result to the host computer PC.

The operation of the embodiment are explained next. In the printing system 1, the host computer PC compresses specific setting data files corresponding to the plurality of printers Pr connected to the network and stores them as the compressed setting data file 30 in the storage unit 13. From the compressed setting data file 30, the host computer PC decompresses a specific setting data file corresponding to the model of a printer specified for printing and enables detailed print settings with respect to the printer.

Figure 4:
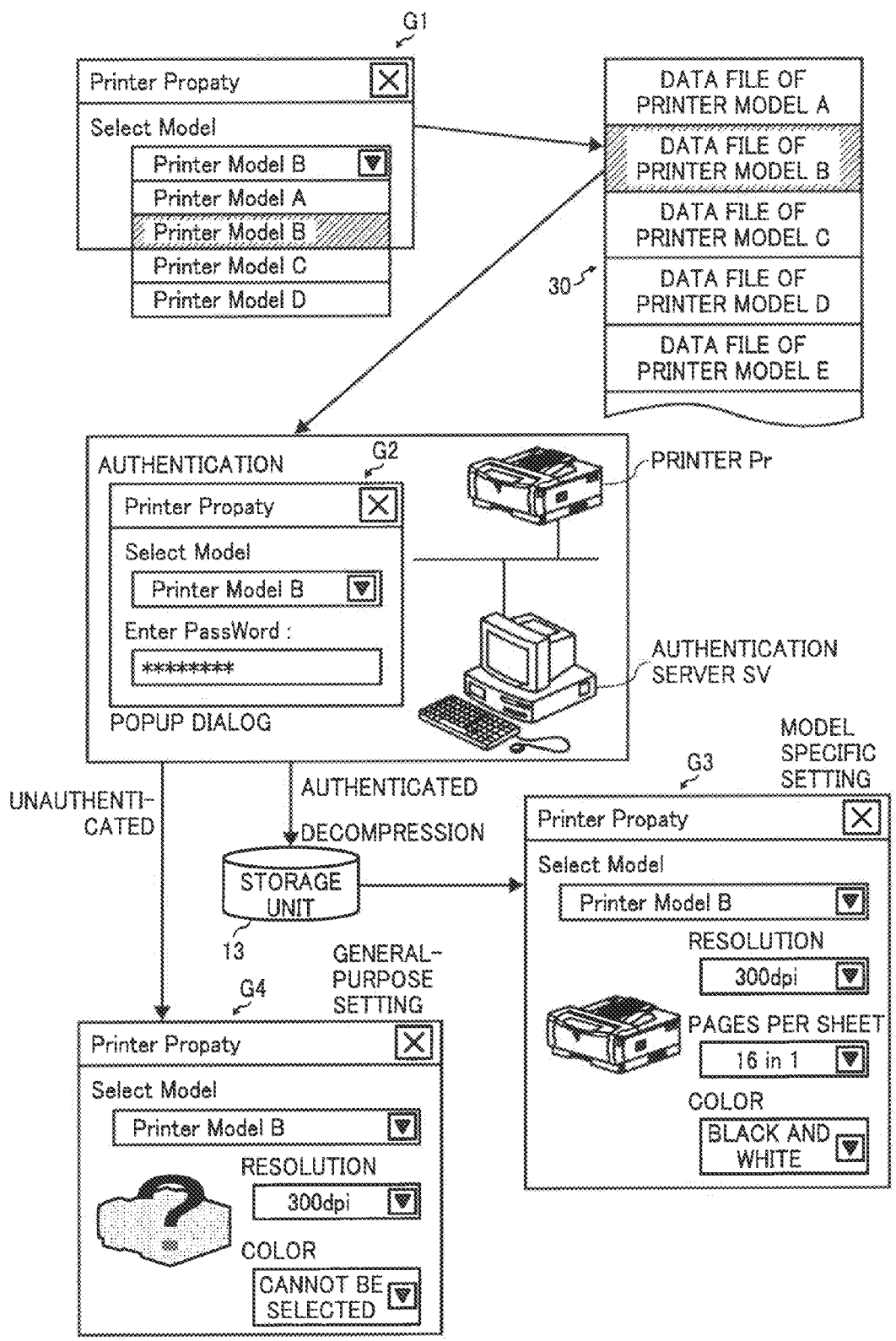
FIG. 4 is a schematic diagram for explaining a print setting process performed by a host computer shown in FIG. 1.
Figure 5:
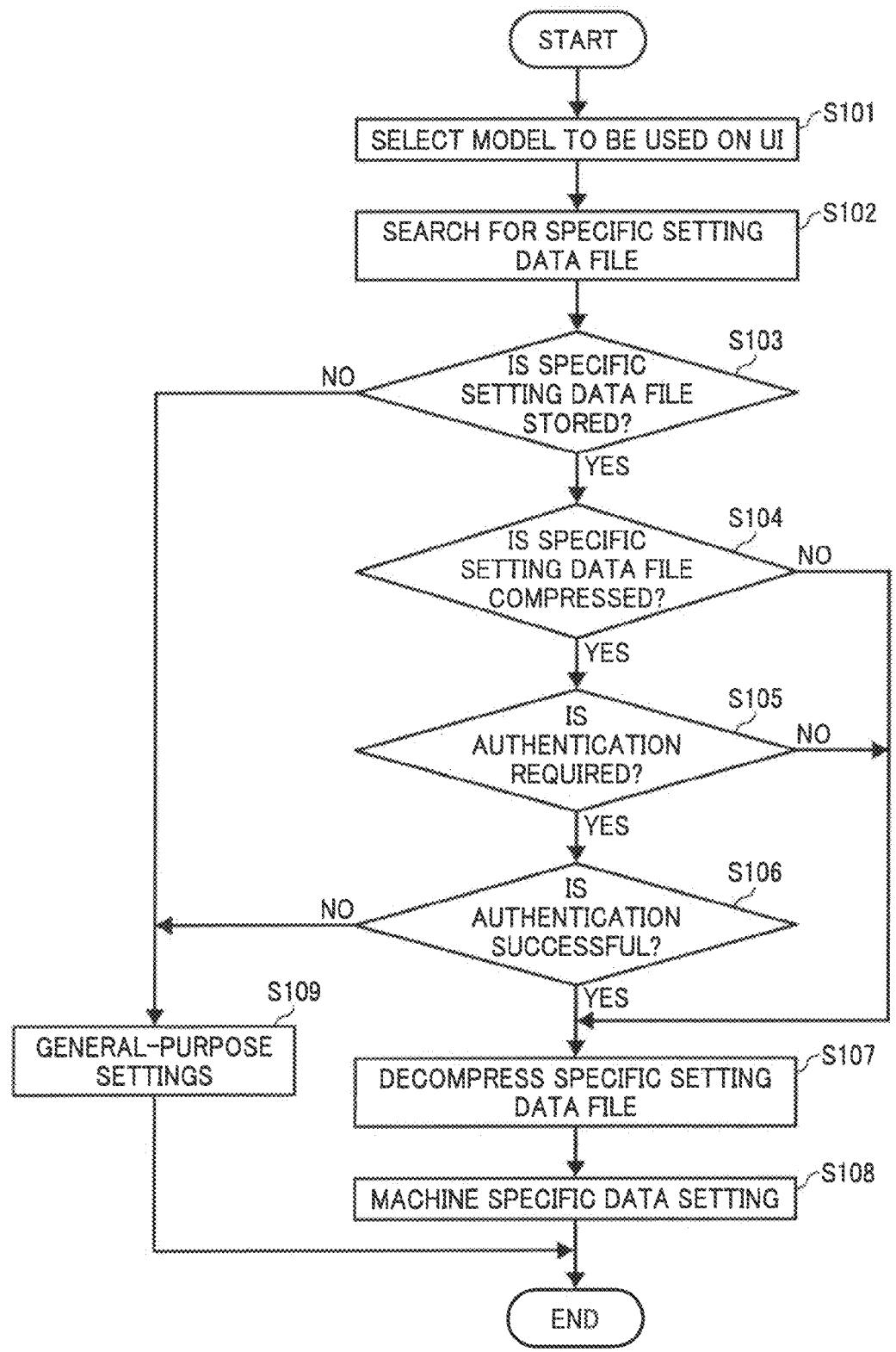
FIG. 5 is a flowchart of the print setting process.

A print setting process is explained with reference to FIGS. 4 and 5. If the driver module 12 is called by a print command from the application/OS 11, the data retrieving module 22 calls, by the call format function, the I/F module 21 for setting printing conditions. When called, the I/F module 21 displays, on the display, the printer selection interface screen G1 as shown in FIG. 4 for selecting a printer to be used for printing. When a printer is selected on the printer selection interface screen G1 (step S101), the I/F module 21 notifies the data retrieving module 22 of the selected printer.

For enabling detailed print settings with respect to the selected printer, the data retrieving module 22 searches the storage unit 13 for a specific setting data file corresponding to the model of the selected printer (step S102) to check whether such a specific setting data file is stored in the storage unit 13 (step S103).

If the specific setting data file corresponding to the model of the selected printer is stored in the storage unit 13 (Yes at step S103), the data retrieving module 22 checks whether the specific setting data file is compressed as the compressed setting data file 30 (step S104). If the specific setting data file is compressed, the data retrieving module 22 checks whether authentication is required for using the compressed setting data file 30 (step S105).

In other words, as shown in FIG. 4, if authentication is required when the printer model B is selected on the printer selection interface screen G1 and the specific setting data file of the printer model B is stored as the compressed setting data file 30, authentication is performed.

If authentication is required (Yes at step S105), the data retrieving module 22 causes the I/F module 21 to display the authentication interface screen G2 as shown in FIG. 4. Upon receiving input of authentication data such as a password and an authentication code through the authentication interface screen G2, the data retrieving module 22 transmits the authentication data to the authentication server SV via the communication module 14.

The authentication server SV compares the transmitted authentication data with authentication data registered therein in advance. After checking whether the transmitted authentication data matches the registered authentication data, the authentication server SV transmits, via the network, the authentication result to the host computer PC that has requested for the authentication.

Upon receiving the authentication result via the communication module 14, the data retrieving module 22 checks whether the authentication data is registered, i.e., whether the authentication is successful (step S106). If the authentication is successful (Yes at step S106), the decompressing module 23 decompresses only the specific setting data file corresponding to the model of the selected printer in the compressed setting data file 30 stored in the storage unit 13 (step S107). The data retrieving module 22 retrieves, from the decompressed specific setting data file, specific print setting data corresponding to the model of the selected printer and notifies the I/F module 21 of the settable items and a range of the setting values. The I/F module 21 displays the specific print setting interface screen G3 as shown in FIG. 4, thereby enabling model specific print settings for the selected printer.

The model specific print settable items are, for example, functions specific to the model of the selected printer such as resolution, pages per sheet, and sheet size as shown on the specific print setting interface screen G3 shown in FIG. 4. Examples of the setting values include A4, A3, 300 dots per inch (dpi), and 600 dpi. The I/F module 21 displays, on the specific print setting interface screen G3, only the items specified in the specific setting data file corresponding to the model of the printer notified by the data retrieving module 22, and enables setting of of printing conditions based on machine data from the application/OS 11.

When print settings have been specified with respect to the model specific print setting items on the specific print setting interface screen G3, the data retrieving module 22 retrieves the print setting contents via the I/F module 21 and sets print settings (step S108).

If the input authentication data is not registered in the authentication server SV and authentication is not successful (No at step S106), the data retrieving module 22 sends the I/F module 21 print setting data commonly set independently of each model. For example, the I/F module 21 displays the common print setting interface screen G4 as shown in FIG. 4 to enable common (general-purpose) print settings such as black and white mode and standard-sheet printing independent of the model.

If print settings are specified with respect to common print setting items on the common print setting interface screen G4, the data retrieving module 22 retrieves the print setting contents via the I/F module 21 and sets the print settings (step S109).

If the specific setting data file of the model corresponding to the selected printer is not stored in the storage unit 13 (No at step S103), the data retrieving module 22 sends the I/F module 21 print setting data commonly set independently of each model. The I/F module 21 displays the common print setting interface screen G4. When print settings are specified with respect to common print setting items on the common print setting interface screen G4, the data retrieving module 22 retrieves the print setting contents via the I/F module 21 and sets the print settings (step S109).

Authentication for decompressing a compressed setting data file is described above as being carried out by the authentication server SV, the printer itself can carry out such authentication through bidirectional communication with the host computer PC.

When a printer once selected to be used for printing by the above process is switched to another, for example, when the printer for printing is switched from the printer A to the printer B shown in FIG. 4, the user selects the printer B on the printer selection interface screen G1 displayed by the I/F module 21. The data retrieving module 22 searches the storage unit 13 for a specific setting data file for the printer B newly selected for printing. Upon detecting the specific setting data file for the printer B, the data retrieving module 22 decompresses the specific setting data file using the decompressing module 23 to retrieve it and stores it in the storage unit 13. Subsequently, the data retrieving module 22 notifies the I/F module 21 of the contents of the specific setting data file of the stored printer B. The I/F module 21 displays the specific print setting interface screen G3 indicating settable model specific print setting items and sets print settings by retrieving the setting contents specified on the specific print setting interface screen G3.

If the unnecessary specific setting data file of the printer A that has already decompressed by the decompressing module 23 is left when the specific setting data file of the printer B is decompressed, the data retrieving module 22 discards the decompressed specific setting data file of the printer A.

As described above, according to the embodiment, the storage unit 13 stores therein the compressed setting data file 30 obtained by compressing a setting data file including model specific print setting items and setting values specific to each model in a predetermined compression format. The decompressing module 23 decompresses, from the compressed setting data file 30, a specific setting data file corresponding to the model of a printer to be used for printing, and the I/F module 21 displays the specific print setting interface screen G3 corresponding to the decompressed specific setting data file. The data retrieving module 22 sets print settings based on setting contents specified on the specific print setting interface screen G3.

By compressing and storing specific setting data files of printers of a plurality of models and decompressing only a specific setting data file corresponding to the model of a printer selected for printing when required, detailed print settings can be appropriately carried out for each model. This facilitates print settings and achieves effective use of the storage capacity of the storage unit 13 that stores therein data related to print settings.

In the host computer PC, the compressed setting data file 30 is formed by compressing a plurality of specific setting data files and combining them as a single file or by combining a plurality of specific setting data files and compressing them together as a single file. In addition to simply compressing each specific setting data file, combining specific setting data files enables to further reduce the data size. Due to this, the storage unit 13 can be more effectively used.

If another specific setting data file that has already decompressed is left in the storage unit 13 when the decompressing module 23 decompresses a specific setting data file, the data retrieving module 22 deletes from the storage unit 13 the other specific setting data file. Therefore, at the time of switching of printers for printing, an unnecessary file is not left in the storage unit 13. Due to this, the storage unit 13 can be effectively used and also a security can be enhanced.

Each of a plurality of specific setting data files of the compressed setting data file 30 is compressed in any one of a plurality of compression formats. The decompressing module 23 decompresses each of the specific setting data files based on the compression format. Thus, specific setting data files compressed in various compression formats can be effectively used and the usability can be enhanced.

The data retrieving module 22 protects the compressed setting data file 30 based on predetermined authentication data. The I/F module 21 displays the authentication interface screen (authentication data input screen) G2 for inputting the authentication data. Upon receiving input of qualified authentication data through the authentication interface screen G2, the decompressing module 23 decompresses the compressed setting data file 30. Thus, loosing of data due to careless decompression of a compressed setting data file can be avoided and the data security can be enhanced.

The data retrieving module 22 requests the authentication server SV connected to the network for authentication of input authentication data. Upon the authentication server SV authenticating the input authentication data, the decompressing module 23 decompresses the compressed setting data file 30. This also prevents loosing of data due to careless decompression of a compressed setting data file and the data security can be further enhanced.

The data retrieving module 22 requests a printer to be used for printing for authentication of input authentication data. When the printer authenticates the input authentication data, the decompressing module 23 decompresses the compressed setting data file 30. This also prevents loosing of data due to careless decompression of a compressed setting data file and the data security can be further enhanced.

As set forth hereinabove, according to an embodiment of the present invention, detailed print settings can be appropriately carried out for printing devices of each model, and a storage unit that stores therein data related to the print settings can be effectively used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processor that transmits print data to any one of a plurality of printers, of a plurality of models, for printing the print data, the data processor comprising:
    a storage unit that stores therein a compressed data file including a plurality of setting data files compressed in respective compression formats for each of the models, each setting data file containing setting items and setting values specific to a corresponding model;
    an authentication unit that authenticates a selected setting data file in the compressed data file by determining whether an authentication process is required and performing the authentication process when the authentication process is determined to be required and proceeding directly to authentication of the selected setting data when no authentication process is determined to be required;
    a decompressing unit that, in response to a determination that the selected setting data file is authenticated, decompresses the selected setting data file in the compressed data file, the selected setting data file corresponding to a model of a printer selected to print the print data;
    an interface unit configured to display a first setting screen on a display that indicates setting items specific to the model of the selected printer based on the selected setting data file decompressed by the decompressing unit, and to display a second setting screen on the display that indicates setting items generic to the plurality of models, the first setting screen being displayed in response to the determination that the selected setting data file is authenticated and the second setting screen being displayed in response to a determination that the selected setting data file is not authenticated; and
    a converting unit that converts image data into the print data according to settings specified on the first or second setting screen.

2. The data processor according to claim 1, wherein the compressed data file includes the plurality of setting data files, the setting data files being compressed and combined into a single file or combined and compressed as a single combined file.

3. The data processor according to claim 1, further comprising a deleting unit that deletes, upon detecting that a decompressed setting data file is present in the storage unit when the decompressing unit decompresses the selected setting data file, the decompressed setting data file from the storage unit.

4. The data processor according to claim 1, wherein
the compressed data file includes the plurality of setting data files, each compressed in the respective compression formats, and
the decompressing unit decompresses the selected setting data file based on a compression format corresponding to the selected setting data file.

5. The data processor according to claim 1, further comprising a protecting unit that performs the authentication process based on predetermined authentication data,
wherein the interface unit displays an authentication screen to receive the authentication data.

6. The data processor according to claim 5, wherein
protecting unit requests an external device to authenticate the input authentication data.

7. The data processor according to claim 5, wherein
protecting unit requests the printer selected to print the print data to authenticate the input authentication data.

8. A data processing method for printing print data by transmitting the print data to any one of a plurality of printers, of a plurality of models, via a network, the data processing method comprising:
storing, in a storage unit, a compressed data file including a plurality of setting data files compressed in respective compression formats, each setting data file containing setting items and setting values specific to a corresponding model;
authenticating a selected setting data file in the compressed data file by determining whether an authentication process is required and performing the authentication process when the authentication process is determined to be required and proceeding directly to authentication of the selected setting data when no authentication process is determined to be required;
decompessing, in response to a determination that the selected setting data file is authenticated, the selected setting data file in the compressed data file, the selected setting data file corresponding to a model of a printer selected to print the print data;
displaying, in response to the determination that the selected setting data file is authenticated, a first setting screen on a display that indicates setting items specific to the model of the selected printer based on the selected setting data file decompressed by the decompressing unit;
displaying, in response to the determination that the selected setting data file is not authenticated, a second setting screen on the display that indicates setting items generic to the plurality of models; and
converting image data into the print data according to settings specified on the first or second setting screen.

9. The data processing method according to claim 8, wherein the storing includes generating the compressed data file by compressing the plurality of setting data files and combining compressed setting data files into a single file or by combining a plurality of setting data files and compressing a single combined file.

10. The data processing method according to claim 8, further comprising deleting, when a decompressed setting data file is present in the storage unit at the decompressing, the decompressed setting data file from the storage unit.

11. The data processing method according to claim 8, wherein
the compressed data file includes the plurality of setting data files each compressed in the respective compression formats; and
the decompressing includes decompressing the selected setting data file based on a compression format corresponding to the selected setting data file.

12. The data processing method according to claim 8, further comprising:
displaying an authentication screen to receive input authentication data, wherein the authentication protects the compressed data file based on the authentication data.

13. The data processing method according to claim 12, wherein
the authenticating includes requesting an external device to authenticate the input authentication data.

14. The data processing method according to claim 12, wherein
the authenticating includes requesting the printer selected to print the print data to authenticate the input authentication data.

15. A non-transitory computer readable medium having computer readable program codes embodied in the medium that, when executed, cause a computer to execute the steps of:
storing, in a storage unit, a compressed data file including a plurality of setting data files compressed in respective compression formats, each setting data file containing setting items and setting values specific to a corresponding model;
authenticating a selected setting data file in the compressed data file by determining whether an authentication process is required and performing the authentication process when the authentication process is determined to be required and proceeding directly to authentication of the selected setting data when no authentication process is determined to be required;
decompressing, in response to a determination that the selected setting data file is authenticated, the selected setting data file in the compressed data file, the selected setting data file corresponding to a model of a printer selected to print the print data;
displaying, in response to the determination that the selected setting data file is authenticated, a first setting screen on a display that indicates setting items specific to the model of the selected printer based on the selected setting data file decompressed by the decompressing unit;
displaying, in response to the determination that the selected setting data file is not authenticated, a second setting screen on the display that indicates setting items generic to the plurality of models; and
converting image data into the print data according to settings specified on the first or second setting screen.

16. The data processor of claim 1, wherein, when the storage unit does not store a setting data file corresponding to the model of the selected printer, the interface unit displays the second setting screen having common setting items that are common to all of the plurality of models.

* * * * *